United States Patent Office 3,644,641
Patented Feb. 22, 1972

---

3,644,641
2-(3-ANILINOPHENYL)ALKANOIC ACIDS AND DERIVATIVES THEREOF IN ANALGESIC COMPOSITIONS AND METHODS
Winston S. Marshall, Indianapolis, Ind., assignor to Eli Lilly and Company, Indianapolis, Ind.
No Drawing. Original application Dec. 26, 1968, Ser. No. 787,192. Divided and this application Dec. 24, 1969, Ser. No. 888,075
Int. Cl. A61k 27/00
U.S. Cl. 424—311    4 Claims

ABSTRACT OF THE DISCLOSURE

Novel alkanoic acids substituted in the 2 position by a 3-anilinophenyl group, their pharmaceutically acceptable salts, and the corresponding ester and amide derivatives. The compounds of this invention are useful as anti-inflammatory agents, and as potentiating agents useful in obtaining enhanced analgesia when combined with α-d-propoxyphene.

---

CROSS-REFERENCE TO RELATED APPLICATION

This application is a divisional application of my co-pending application Ser. No. 787,192, filed Dec. 26, 1968.

This invention relates to novel 2-(3-anilinophenyl)-alkanoic acids, their pharmaceutically acceptable cationic salts, and the corresponding ester and amide derivatives, to therapeutic compositions containing such compounds; and to methods of treating inflammation, pain, and fever in mammals.

The compounds of this invention are represented by Formula I:

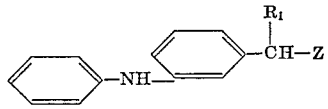

(I)

wherein:

$R_1$ is hydrogen or $C_1$–$C_5$ alkyl; and
Z is either:

(a) —$COOR_2$, $R_2$ being hydrogen, $C_1$–$C_5$ alkyl, or an alkali metal, alkaline earth metal, ammonium, or substituted ammonium cation; or (b)

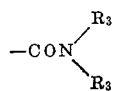

wherein each $R_3$ is the same or a different member of the group consisting of hydrogen, hydroxy, or $C_1$–$C_3$ alkyl.

"Alkali metal," as used herein, refers to sodium and potassium.

"Alkaline earth metal" refers to calcium and magnesium.

"Substituted ammonium" includes methyl ammonium, diethylammonium, benzylammonium, triethanolammonium, and the like.

"$C_1$–$C_5$ alkyl" refers to both straight and branched chain alkyls including methyl, ethyl, n-propyl, iso-propyl, n-butyl, sec-butyl, tert-butyl, iso-butyl, n-amyl, iso-amyl, neo-pentyl, and the like.

Compounds represented by the above formula are excellent anti-inflammatory agents and thus are useful in treating inflammatory diseases in warm-blooded mammals. In addition to their anti-inflammatory activity, the compounds of this invention also exhibit mild analgesic and anti-pyretic activity. Surprisingly, the compounds of this invention also enhance the analgesic activity of various known analgesic agents such as α-d-propoxyphene, and the like. Therapeutic compositions comprising, as their active ingredients, one or more compounds of the above formula, in association with a pharmaceutically acceptable diluent or carrier, are also provided by this invention.

Representative 2 - (3 - anilinophenyl)alkanoic acids, esters, amides, and salts include:

2-(3-anilinophenyl)propionic acid, sodium salt
2-(3-anilinophenyl)acetic acid
2-(3-anilinophenyl)butyric acid
2-(3-anilinophenyl)valeric acid, calcium salt
2-(3-anilinophenyl)acetic acid, ammonium salt
2-(3-anilinophenyl)acetic acid, benzyl ammonium salt
Methyl 2-(3-anilinophenyl)propionate
Ethyl 2-(3-anilinophenyl)propionate
t-Butyl 2-(3-anilinophenyl)propionate
n-Amyl 2-(3-anilinophenyl)propionate
2-(3-anilinophenyl)propionamide
N-hydroxy-2-(3-anilinophenyl)acetamide
N-methyl-2-(3-anilinophenyl)propionamide
N,N-diethyl-2-(3-anilinophenyl)propionamide
N-iso-propyl-2-(3-anilinophenyl)acetamide
2-(3-anilinophenyl)acetamide
2-(3-anilinophenyl)butyramide
2-(3-anilinophenyl)valeramide
Ethyl 2-(3-anilinophenyl)acetate
n-Propyl-2-(3-anilinophenyl)valerate The 2-(3-anilinophenyl)alkanoic acids and their aforementioned derivatives can be prepared by methods which are well known for the preparation of diphenylamine derivatives.

The desired anilinophenyl alkanoic acids can advantageously be prepared by the Willgerodt reaction. In this reaction, for example, 3-anilinoacetophenone is heated with morpholine and sulfur, and the resulting thioamide is hydrolyzed to yield the desired 2-(3-anilinophenyl) acetic acid.

The acids so prepared can advantageously be α-alkylated by treating their corresponding N-formyl or acetyl derivatives with two equivalents of sodium amide in liquid ammonia, followed by the addition of an alkyl halide, for example methyl iodide, and subsequent hydrolysis of the formyl or acetyl protecting group.

The acids, prepared by the above-described methods, are converted to the corresponding esters by methods well known in the art, such as by heating the acid with an alcohol in the presence of a mineral acid.

The amides of this invention are obtained by reacting the aforementioned ester with an amine. This reaction is customarily carried out by heating the ester with an excess of the amine, in a pressure vessel, optionally in the presence of an alcohol solvent and a metal alkoxide catalyst, for example, sodium methoxide.

The starting materials can readily be prepared by methods well known in the art. For instance, 3-anilinoacetophenone can be obtained by heating formanilide with 3-bromoacetophenone in the presence of cupric carbonate and potassium carbonate.

The 2-(3-anilinophenyl)alkanoic acids of Formula I are readily converted into pharmaceutically acceptable cationic salts by methods well known in the art. Thus, such salts can be obtained by reacting an alkali metal, or alkaline earth metal base, ammonia, or an amine, with an acid of Formula I in an appropriate solvent such as an alcohol, an ether, a ketone, or water. The resulting salt is separated by filtration, decantation, or evaporation of the solvent.

The following examples illustrate the preparation of the compounds of this invention.

EXAMPLE 1

Preparation of 2-(3-anilinophenyl)acetic acid

To 121 g. of formanilide and 210 g. of 3-bromoacetophenone were added 4.8 g. of cupric carbonate and 207 g. of potassium carbonate. The components were mixed and heated to about 200° C. Condensed water was azeotroped from the reaction. The reaction was allowed to reflux at 210° C. overnight, cooled, added to benzene, and filtered. The reaction mixture was then diluted with chloroform, refiltered, and the organic layer washed with water, 10 percent sodium hydroxide, 6 N hydrochloric acid, and water, dried over sodium sulfate, and evaporated to an oil. The oil was distilled to yield 48.8 g. of crude 3-anilinoacetophenone, B.P. 180–220° C./0.2 mm., which crystallized on standing. This was recrystallized from ethyl acetate and n-hexane to yield 36.2 g. of 3-anilinoacetophenone, M.P. 83–85° C.

*Analysis.*—Calcd. for $C_{14}H_{13}NO$ (percent): C, 79.59; H, 6.20; N, 6.63. Found (percent): C, 79.45; H, 6.32; N, 6.38.

To 33 g. of the 3-anilinoacetophenone were added 17.9 g. of sulfur and 48.7 g. of morpholine. The reaction mixture was refluxed overnight with stirring and cooled. The reaction mixture was then refluxed overnight with excess 15 percent potassium hydroxide, cooled, and extracted with ethyl ether. The aqueous phase was then acidified with 6 N hydrochloric acid and extracted with ethyl ether. The ether extract was washed twice with water, dried over sodium sulfate, and evaporated to dryness in vacuo. The crude product was suspended in boiling hexane and a small amount of ethylacetate was added until the product went into solution. The crystalline product so formed was filtered and dried to yield 25.7 g. of 2-(3-anilinophenyl)acetic acid, M.P. 137–139° C.

*Analysis.*—Calcd. for $C_{14}H_{13}NO_2$ (percent): C, 73.99; H, 5.77; N, 6.16. Found (percent): C, 73.71; H, 5.82; N, 5.92.

EXAMPLE 2

Preparation of sodium 2-(3-anilinophenyl)propionate 2-(3-anilinophenyl)propionic acid is converted to the sodium salt by adding it to an appropriate amount of 2 N. sodium hydroxide with stirring and cooling. The aqueous solution is evaporated in vacuo to near dryness. The semi-dry residue is stirred with ethyl acetate and evaporated in vacuo. The white solid residue is dissolved in the smallest possible amount of boiling ethyl acetate, filtered into a suitable container, and allowed to stand at 7° C. overnight. The resulting crystalline mass is filtered and dried in vacuo at room temperature to yield sodium 2-(3-anilinophenyl)propionate.

The present invention includes within its scope pharmaceutical compositions comprising, as an active ingredient, at least one of the compounds of this invention in association with a pharmaceutical carrier or diluent. The compounds of this invention exhibit both oral and parenteral activity and can be formulated in dosage forms for oral, parenteral, rectal, or topical administration.

Solid dosage forms for oral administration include tablets, pills, powders, and granules. In such solid dosage forms, the active compound is admixed with at least one inert diluent such as sucrose, lactose, or starch. Such dosage forms can also comprise, as is normal practice, additional substances other than inert diluents, e.g., lubricating agents such as magnesium stearate. In the case of tablets and pills, the dosage forms may also comprise buffering agents, and can additionally be prepared with enteric coatings.

Liquid dosage forms for oral administration include pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents, and sweetening, flavoring, and perfuming agents.

Preparations according to this invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying, and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain in addition to the active substance, excipients such as cacao butter or a suppository wax.

The dosage of active ingredient in the composition of this invention may be varied; however, it is necessary that the amount of the active ingredient shall be such that a suitable dosage form is obtained. The selected dosage depends upon the desired therapeutic effect, on the route of administration, and on the duration of the treatment. Generally, dosage levels of between 1–100 mg./kg. of body weight are administered to mammals to obtain effective relief of inflammation, pain, and fever.

The following examples further illustrate the pharmaceutical compositions which are a feature of this invention.

EXAMPLE 3

Tablets weighing 500 mg. and having the following compositions are prepared:

| | Mg. |
|---|---|
| 2-(3-anilinophenyl)propionic acid, sodium salt | 250 |
| Starch | 190 |
| Colloidal silica | 50 |
| Magnesium stearate | 10 |

EXAMPLE 4

Tablets weighing 200 mg. and having the following compositions are prepared:

| | Mg. |
|---|---|
| 2-(3-anilinophenyl)acetic acid | 50 |
| Starch | 120 |
| Colloidal silica | 27 |
| Magnesium stearate | 3 |

Tablets analogous to those described in Examples 3 and 4 can be prepared by replacing the above active ingredients by the same weight of any other compound coming within the scope of this invention. Such tablets can be enteric coated and can additionally comprise buffering agents and the like.

Certain compounds of this invention have also been found to enhance the level of analgesia obtained with certain esters of 1,2-diphenyl-2-hydroxy-3-methyl-4-(substituted)amino butanes to that of the more potent, but narcotic, analgesic agents, thereby greatly reducing the necessity for using narcotics for the relief of severe pain. Such a result can be achieved, for example, by combining α-d-1,2-diphenyl-2-propionoxy-3-methyl-4-dimethylaminobutane, commonly known and hereinafter referred to as α-d-propoxyphene or a pharmaceutically acceptable acid addition salt thereof, with, for example, 2-(3-anilinophenyl)acetic acid or a pharmaceutically acceptable cationic salt thereof. Accordingly, improved analgesic compositions comprising, for example, α-d-propoxyphene in combination with, for example, 2-(3-anilinophenyl)acetic acid are also within the scope of this invention.

α-d-Propoxyphene can be employed as the free base or as one of its pharmaceutically acceptable acid addition salts. Such salts are readily prepared by reacting the free amine with an organic or inorganic acid. Representative salts include the hydrochloride, hydrobromide, sulfate, bisulfate, acetate, valerate, oleate, phenate, laurate, borate, benzoate, lactate, phosphate, tosylate, citrate, maleate, fumarate, succinate, tartrate, napsylate (salt of 2-naphthalenesulfonic acid), and the like.

In the following teaching, the term α-d-propoxyphene is used to refer to the foregoing compound either as the free base or as a pharmaceutically acceptable acid addition salt thereof.

By virtue of the potentiating effect of the anilinophenyl compounds, α-d-propoxyphene can be used in smaller dosages than is normally required. However, it is preferred to employ the usual dosages of α-d-propoxyphene in order to obtain a more pronounced analgesic effect than is otherwise obtainable so that the novel analgesic compositions can be used to relieve extremely severe pain.

Accordingly, the dosage of α-d-propoxyphene which constitutes an analgesically effective amount in accordance with the present invention can vary within wide limits. Enhancement of the analgesic effects of α-d-propoxyphene by an anilinophenyl compound as defined hereinabove produces therapeutic effects at dosage levels well below those already known and employed for the use of α-d-propoxyphene alone, and the use of such lower dosage levels in the compositions of this invention are within the scope of the invention. However, for the reasons stated, the previously employed dosages are preferred. Generally, the effective single oral dose of α-d-propoxyphene is from 0.5 to 30 mg./kg. of body weight. When combined with an anilinophenyl compound according to the practice of this invention, the effective single oral dose of α-d-propoxyphene is in the range of 0.05 to 30 mg./kg. of body weight and the effective subcutaneous dose is from 0.2 to 20 mg./kg.

Current practice with respect to the administration of α-d-propoxyphene is described in Physicians' Desk Reference to Pharmaceutical Specialties and Biologicals (for example, 22nd edition, published 1967 by Medical Economics, Inc., subsidiary of Chapman-Reinhold, Inc., Oradell, N.J. (p. 777)).

The anilinophenyl compounds are administered in doses of 1.0 to 100 mg./kg. in combination with the usual established therapeutic dosage levels of α-d-propoxyphene in order to obtain a more profound analgesic effect. Generally, the compounds can be administered in the ratio of one part by weight of an anilinophenyl compound to from 0.005 to 20 parts by weight of α-d-propoxyphene. The presently preferred ratio is one part by weight of one of the above potentiating compounds to five parts by weight of α-d-propoxyphene. Thus, for example, if 32 mg. of α-d-propoxyphene hydrochloride were to be administered to relieve pain, there would be combined therewith 6.4 mg. of 2-(3-anilinophenyl)acetic acid, sodium salt.

The improved analgesic compositions of this invention can be employed in any of the usual therapeutic dosage forms. Solid dosage forms for oral administration include tablets, pills, powders, and granules. In such solid dosage forms, the active compounds are admixed with at least one inert diluent such as sucrose, lactose, or starch. The compositions may also comprise, as is normal practice, additional substances other than inert diluents, e.g., lubricating agents such as magnesium stearate.

Liquid dosage forms for oral administration include pharmaceutically acceptable emulsions, solutions, suspensions, syrups, and elixirs containing inert diluents commonly used in the art, such as water. Besides inert diluents, such compositions may also comprise adjuvants, such as wetting, emulsifying, and suspending agents, and sweetening, flavoring, and perfuming agents.

Preparations according to this invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters, such as ethyl oleate. Such compositions may also contain adjuvants such as preserving, wetting, emulsifying, and dispersing agents. They may be sterilized by, for example, filtration through a bacteria-retaining filter, by incorporating sterilizing agents into the compositions, by irradiation, or by heating. They can also be manufactured in the form of sterile solid compositions, which can be dissolved in sterile water or some other sterile injectable medium immediately before use.

Compositions for rectal administration are suppositories which may contain, in addition to the active substances, excipients such as cacao butter or a suppository wax.

For reasons of convenience in administration, filled capsules are the preferred therapeutic dosage form. Such filled capsules are readily prepared, using conventional excipients and extending agents known in the art. It will be understood by those skilled in the art that other active therapeutic ingredients can be included in the novel compositions of this invention.

The compositions of this invention can be administered, as can α-d-propoxyphene, either intermittently for isolated episodes of pain, or on a regular basis (i.e., every 4 to 6 hours) when pain persists over a period of time.

For reasons of convenience, the preferred method of enhancing the analgesic activity of α-d-propoxyphene in accordance with this invention is to administer compositions containing, in combination, both α-d-propoxyphene and an anilinophenyl compound. However, the level of analgesia obtained with α-d-propoxyphene is also enhanced when, for example, 2-(3-anilinophenyl)acetic acid is administered simultaneously but separately. It will also be apparent to those skilled in the art that so long as the two substances are present in the body at the same time, the objects of this invention have been fulfilled.

The following example further illustrates the present invention.

EXAMPLE 5

A typical composition suitable for filling into gelatin capsules is prepared by thoroughly mixing five parts by weight of α-d-propoxyphene hydrochloride, one part by weight of 2-(3-anilinophenyl)acetic acid, and 1.3 parts by weight of starch. The mixture is filled into No. 1 gelatin capsules in an amount such that each finished capsule contains about 32 mg. of α-d-propoxyphene hydrochloride and about 6.4 mg. of 2-(3-anilinophenyl)acetic acid.

If desired, the foregoing composition can be made to contain, in addition, about 10 parts by weight of acetylsalicylic acid, in which case each capsule will also contain about 320 mg. of acetylsalicyclic acid.

I claim:

1. An improved analgesic composition comprising, in combination, from 0.005 to 20 parts by weight of α-d-propoxyphene or a pharmaceutically acceptable acid addition salt thereof, to about one part weight of a 2-(3-anilinophenyl)alkanoic acid having from 2 to 5 carbon atoms in the alkanoic acid moiety, or a pharmaceutically acceptable cationic salt thereof.

2. A composition as defined in claim 1 wherein the composition comprises from 0.005 to 20 parts by weight of α-d-propoxyphene or a pharmaceutically acceptable acid addition salt thereof, to about one part by weight of 2-(3-anilinophenyl)acetic acid or a pharmaceutically acceptable cationic salt thereof.

3. The method of treating a mammal which comprises administering to the said mammal, a composition as defined in claim 1.

4. The method of treating a mammal as defined in claim 3 wherein the composition administered to the said mammal comprises from 0.005 to 20 parts by weight of α-d-propoxyphene or a pharmaceutically acceptable acid addition salt thereof to about one part by weight of 2-(3-anilinophenyl)acetic acid or a pharmaceutically acceptable cationic salt thereof.

References Cited

UNITED STATES PATENTS

| 3,107,263 | 10/1963 | Scherrer | 260—518 |
| 3,390,172 | 6/1968 | Scherrer | 260—518 |
| 3,413,313 | 11/1968 | Scherrer | 260—518 |
| 3,413,339 | 11/1968 | Scherrer | 260—518 |
| 3,144,387 | 8/1964 | Jones | 260—518 |

OTHER REFERENCES

Chem. Abst. 68; 68730X (1968).

STANLEY J. FRIEDMAN, Primary Examiner

U.S. Cl. X.R.

424—309, 317, 324